(12) United States Patent
Bosse et al.

(10) Patent No.: US 10,214,177 B2
(45) Date of Patent: Feb. 26, 2019

(54) BELT RETRACTOR FOR A SEATBELT DEVICE

(71) Applicant: Autoliv Development AB, Vårgårda (SE)

(72) Inventors: Uwe Bosse, Tornesch (DE); Volkmar Heine, Hamburg (DE); Amir Mazlan, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 125 days.

(21) Appl. No.: 15/301,413

(22) PCT Filed: Apr. 15, 2015

(86) PCT No.: PCT/EP2015/058145
§ 371 (c)(1),
(2) Date: Jan. 24, 2017

(87) PCT Pub. No.: WO2015/158762
PCT Pub. Date: Oct. 22, 2015

(65) Prior Publication Data
US 2018/0043858 A1    Feb. 15, 2018

(30) Foreign Application Priority Data

Apr. 16, 2014  (DE) .......................... 10 2014 207 297

(51) Int. Cl.
*B60R 22/405*    (2006.01)
(52) U.S. Cl.
CPC ................. *B60R 22/405* (2013.01)

(58) Field of Classification Search
CPC .............................. B60R 22/405; B60R 22/36
See application file for complete search history.

(56) References Cited

U.S. PATENT DOCUMENTS

2003/0132334 A1\* 7/2003 Koning ................... B60R 21/04
                                                         242/382
2004/0195422 A1\* 10/2004 Fleischmann ......... B60R 22/415
                                                         242/382.2

(Continued)

FOREIGN PATENT DOCUMENTS

| DE | 10 2005 030 568 A1 | 5/2006 |
| DE | 10 2009 011 091 A1 | 9/2010 |
| EP | 2 282 016 B1 | 2/2012 |

OTHER PUBLICATIONS

German Examination Report—dated Mar. 3, 2015.
PCT International Search Report—dated Jun. 30, 2015.

*Primary Examiner* — Sang K Kim
(74) *Attorney, Agent, or Firm* — Brinks Gilson & Lione

(57) ABSTRACT

A seat belt retractor for a seat belt device for a vehicle with a belt shaft that is rotatably supported in a belt retractor frame, and a blocking device with a locking catch. A sensor device (2) is provided with a first blocking lever (5) which actuates the locking device based on vehicle deceleration via movement of a first blocking lever (5). A second blocking lever (7) supported on the belt extractor for fixing the first blocking lever (5) when there is a predetermined belt extraction length. A counter gear (3) driven by the belt shaft is provided being formed by an eccentric (27) that drives the belt shaft and a wobble plate (8) having a first toothing (19) that can be driven by eccentric (27) to perform a wobbling movement.

17 Claims, 5 Drawing Sheets

(56) References Cited

U.S. PATENT DOCUMENTS

| | | | |
|---|---|---|---|
| 2009/0057470 A1* | 3/2009 | Hiramatsu | B60R 22/405 |
| | | | 242/396.1 |
| 2009/0057471 A1 | 3/2009 | Hiramatsu et al. | |
| 2012/0303219 A1 | 11/2012 | Osada et al. | |
| 2013/0140869 A1 | 6/2013 | Uchibori | |
| 2015/0217722 A1* | 8/2015 | Osada | B60R 22/40 |
| | | | 242/384.1 |

* cited by examiner

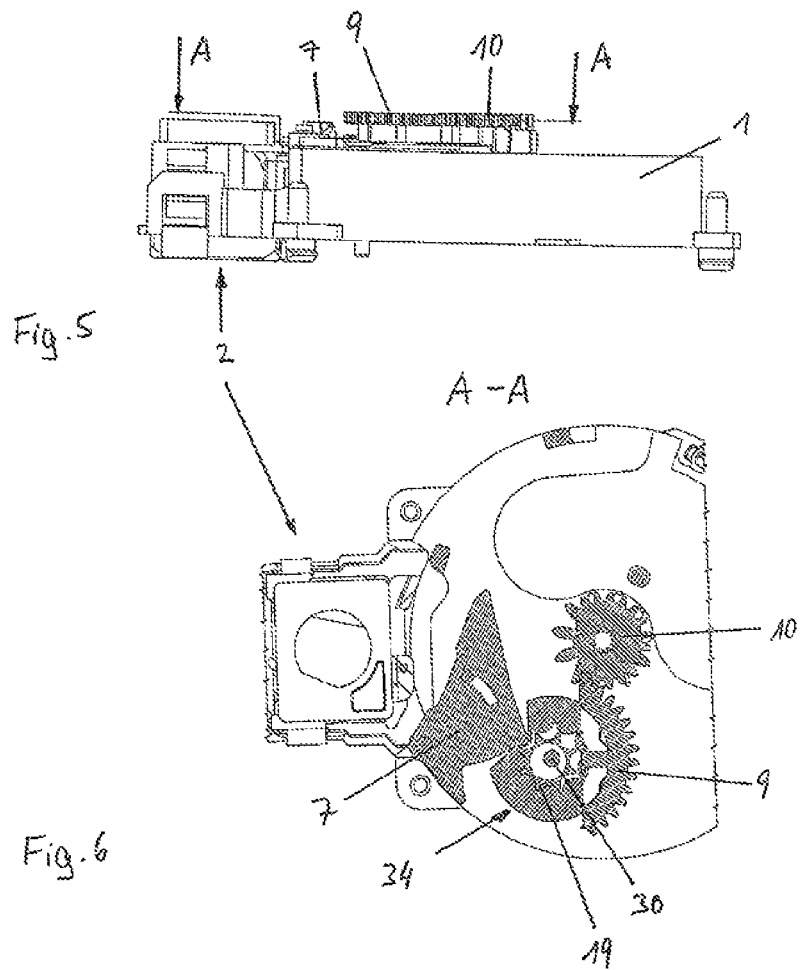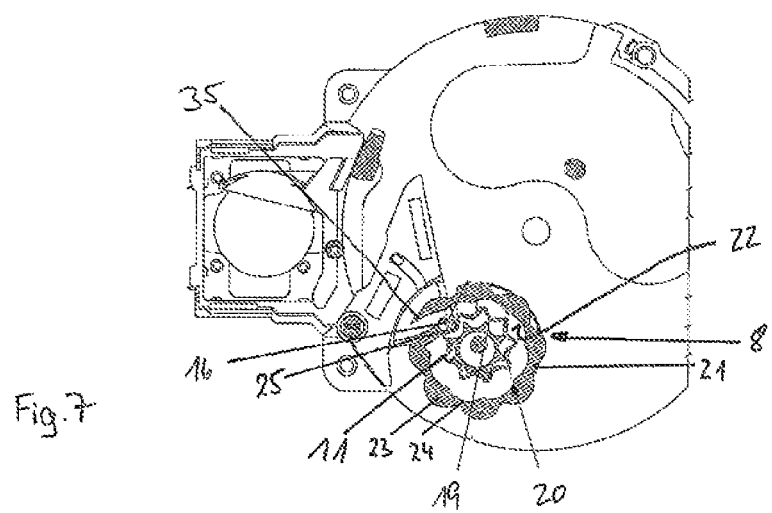

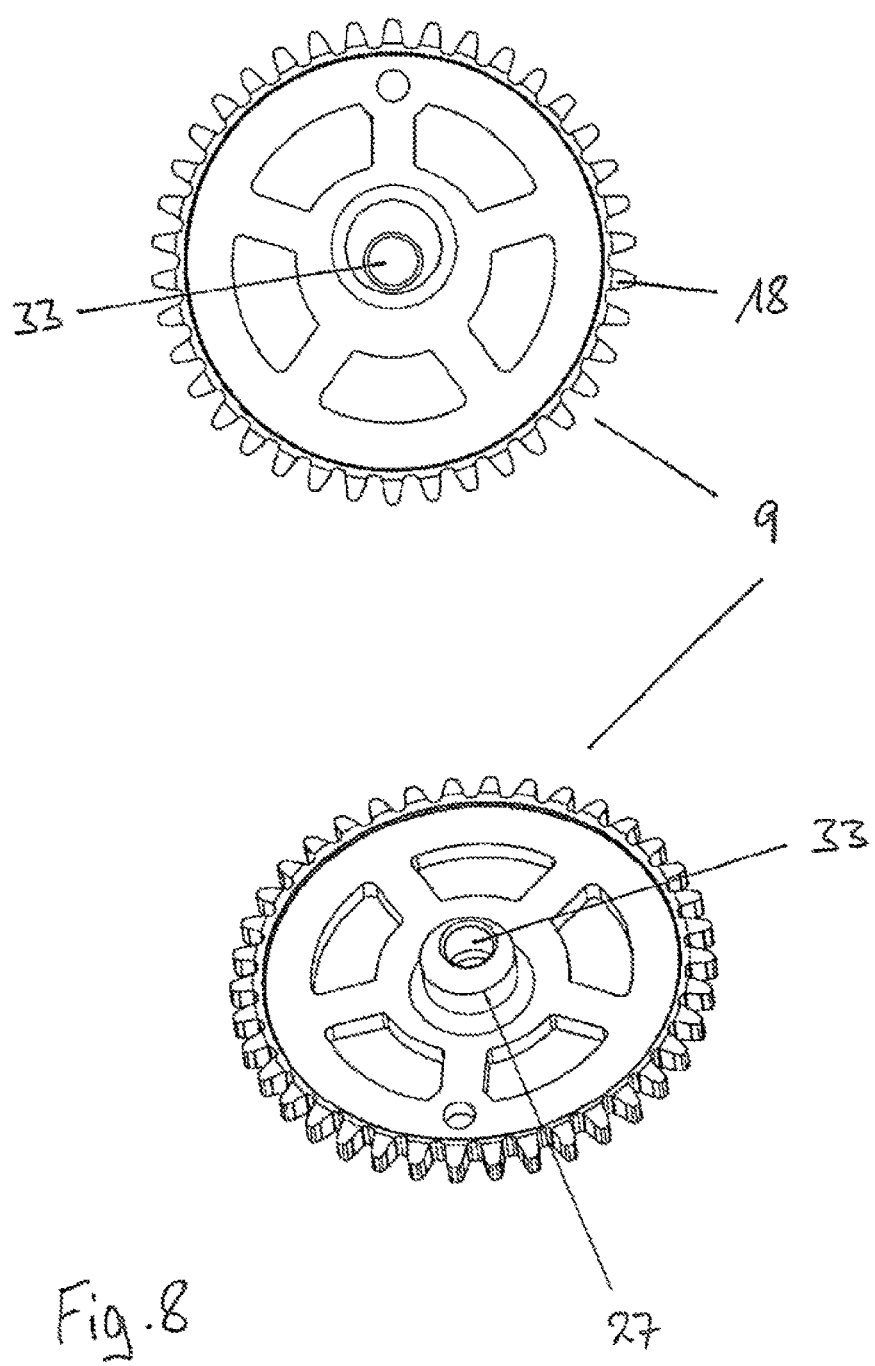

BELT RETRACTOR FOR A SEATBELT DEVICE

CROSS REFERENCE TO RELATED APPLICATIONS

This application claims priority to German Patent Application No. 10 2014 207 297.2, filed on Apr. 16, 2014 and PCT/EP2015/058145, filed on Apr. 15, 2015.

FIELD OF THE INVENTION

The invention relates to a seat belt retractor for a seat belt device.

BACKGROUND

Generally speaking, seat belt retractors serve the purpose of winding up a seat belt of the seat belt device in motor vehicles. Typically the seat belt retractor has, among other things, a blocking device which is actuated subject to the exceedance of predetermined acceleration values of vehicle deceleration and may further sense seat belt withdrawal acceleration and in this way subsequently blocks the seat belt against further seat belt withdrawal movement. A sensor device is provided to actuate the blocking device subject to the exceedance of a predetermined value of vehicle deceleration (vehicle-sensitive sensor device), which sensor device typically includes an inertial mass, supported on a sensor surface and abutting on a blocking lever. Furthermore, a control disk is provided with a toothing (gear teeth), which control disk is rotatably supported on a belt shaft of the seat belt retractor, and which, with relative movement with respect to the belt shaft, forces a locking catch of the blocking device to perform a movement that steers the catch into a blocking toothing. The movement of the control disk relative to the belt shaft is caused by the sensor device by the inertial mass being deflected, and the blocking lever thereby being deflected. The deflection of the blocking lever causes it to engage into a toothing of the control disk, so that the control disk is stopped with respect to the belt shaft.

However, for various reasons it has proved useful to deactivate the vehicle-sensitive sensor device starting at a certain belt withdrawal length. This can, for example, be the case when there is switching between an ELR (emergency locking retractor) and an ALR (automatic locking retractor) operation of the seat belt retractor, or in seat belt retractors that are installed in tiltable backrests, if the belt shaft should always be blocked at certain lengths of seat belt withdrawal, or if a blocking of the belt shaft should not take place starting at a certain seat belt retraction length even when there is a deflection of the inertial mass.

In this respect it is known, for example from EP 2 282 916 B1, to fix the blocking lever of the vehicle-sensitive sensor device with a second blocking lever whose movement is controlled by a counter gear driven by the belt shaft. Here the counter gear is formed by a gearing with a gearwheel disposed on a rocker, wherein the rocker, due to a certain arrangement of skips in the toothing of the gearwheels is forced, at a predetermined length of belt extraction, to perform a rocking movement by which the movement of the second blocking lever is controlled.

The object of the present invention is to provide a seat belt retractor with which the switching-on and switching-off of the sensor device that detects the vehicle deceleration is provided in a simple manner achieved by a seat belt retractor described herein and illustrated by the accompanying figures.

SUMMARY AND INTRODUCTORY DESCRIPTION

According to a feature of the present invention, it is proposed that the counter gear is formed by an eccentric driven by the belt shaft and a wobble plate with a first toothing, which wobble plate is drivable by the eccentric to a wobbling movement, wherein a second toothing fixed with respect to the vehicle is provided, on which the wobble plate rolls via the first toothing during the wobbling motion, wherein a control contour is provided on the wobble plate, which control contour has a course such that starting at a predetermined belt retraction length, the wobble plate comes into abutment against the control contour on the second blocking lever, and during the further wobbling motion forces the second blocking lever into a position wherein it blocks the first blocking lever of the sensor device.

Using the proposed solution, a very simple and in particular compact counter gear, and thus also a belt extractor with a very small installation-space requirement, can be provided. In addition, using the proposed solution, the counter gear has only a very small number of individual parts, so that the manufacturing costs and assembly effort are relatively small. Only the driven eccentric, the second blocking lever, and the wobble plate are required as additional parts for the realizing of the invention, all of which can be very economically produced as plastic injection-molded parts in large-batch production.

Here the wobble plate is preferably rotatably supported on the eccentric. The eccentric plate thereby only serves to generate the wobbling movement of the wobble plate, whereas the feed motion of the swashplate in the direction of rotation is caused by the meshing of the swashplate with the first toothing on the second toothing fixed with respect to the user.

It is further proposed that the second blocking lever abuts on the second toothing fixed with respect to the vehicle when it is in the position that does not block the first blocking lever, and that the control contour is formed such that starting from the predetermined belt retraction length, the wobble plate displaces the second blocking lever from the toothing fixed with respect to the vehicle. The second blocking lever is stationary, abutting on the second toothing in the position that does not block the first blocking lever, and the wobble plate wobbles around the blocking lever until it comes to rest, with a section of the control contour, against the second blocking level. During further wobbling movement of the wobble plate, the wobble plate then displaces the second blocking lever from the second toothing, whereby the second blocking lever performs a wobbling movement by which it comes into a position wherein it blocks the first blocking lever. A further advantage of the invention is that due to the blocking of the first blocking lever, the inertial mass is also blocked and can thus perform no more movements that cause noise.

It is also proposed that the second toothing fixed with respect to the vehicle is formed by a toothed ring that is internally and externally toothed, that the wobble plate abuts with the first toothing on the internal toothing of the toothed ring, and that the second blocking lever, in the position that does not block the first blocking lever, abuts on the external toothing of the toothed ring. In this way, the toothed ring serves two functions, that of an abutment for the first toothing of the swashplate that meshes with it by which the feed movement is forced, and in addition as an abutment for the second blocking lever in the position wherein it does not fix the first blocking lever.

It is also proposed that the wobble plate has a control contour in the shape of a ring with a wave-shaped radial inner surface and a wave-shaped outer surface, wherein the wave shapes are preferably arranged and dimensioned such that the wave crests and troughs form regularly-arranged thick and thin points. With the proposed shape of the wobble plate, it can at least in certain sections of the angle of rotation, wobble around the second blocking lever abutting on the vehicle-fixed toothing without the lever being forced into motion. Here the thick and thin points are significant, because in this way a wave-structure is created on the outside and the inside of the control contour, which enables a wobbling of the wobble plate around the second blocking lever both when the second blocking lever abuts on the vehicle-fixed toothing and when the second blocking lever abuts on the outer surface of the control contour in the position wherein it blocks the first blocking lever. In this way, due to the wave-structure of the control contour, there can be enough compensation for the wobbling motion of the wobble plate that the wobble plate can also perform the wobbling motion in relation to the second blocking lever, which is not moving, in the radial direction until it reaches the switching position.

It is additionally proposed that the second blocking lever is also guided by a guide opposite the belt extractor. The second blocking lever is pivotably supported in a pivot-bearing on the belt retractor. The movement of the second blocking lever is forced by the interaction with the wobble plate described above. Moreover, the second blocking lever is additionally guided by a guide on the belt retractor so that the movement of the second blocking lever is forced not only by the swashplate; the course is also prescribed by the guide; so that the second blocking lever is in each case securely moved into the position that blocks the first blocking lever. The movement of the second blocking lever is thus triggered and driven by the swashplate, or as the case may be its control contour, whereas its course is defined by the guide.

A particularly reliable guiding of the second blocking lever can be realized by the guide being formed by a control contour provided on the second blocking lever, with which contour the second blocking lever abuts on a guiding pin fixed with respect to the vehicle.

In addition, the second blocking lever can be formed by a plate, whereby the guide contour is in this case preferably formed by a groove in the plate. Because of this, the second blocking lever is guided laterally and can only perform a movement in a longitudinal direction.

BRIEF DESCRIPTION OF THE DRAWINGS

The invention will be explained below based on preferred embodiments with reference to the accompanying Figures.

FIG. 5 shows a side view of the housing cap;

FIG. 6 shows a sectional view through the housing cap along the cut direction A-A in FIG. 5;

FIG. 7 shows the housing cap with a sectional view through the wobble plate; and FIG. 8 shows the gearwheel with eccentric.

DETAILED DESCRIPTION

Figure 1:
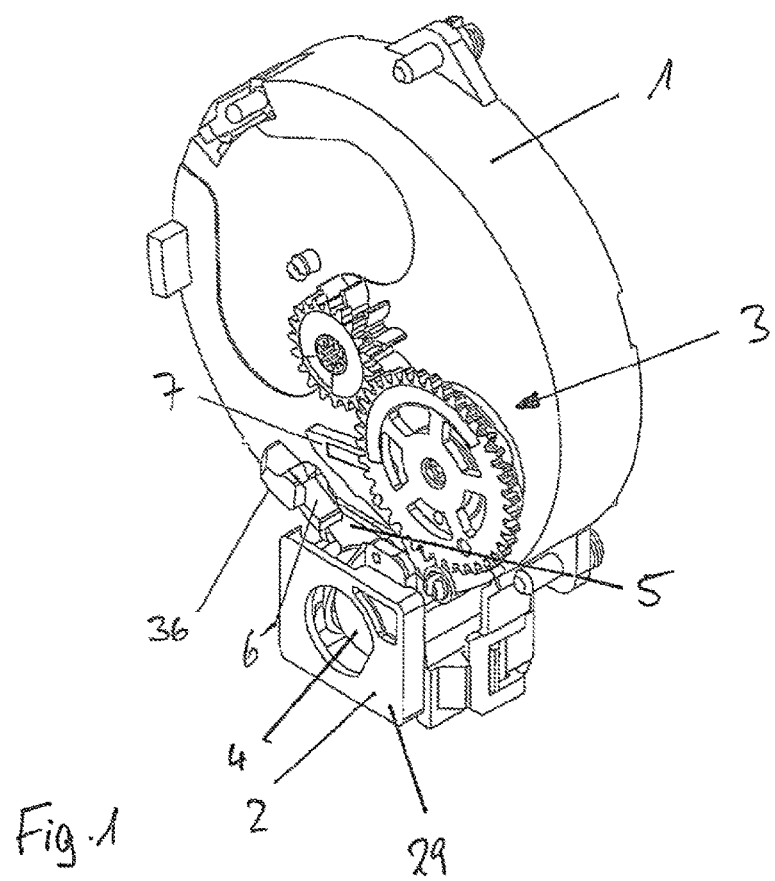
FIG. 1 shows an oblique view of a housing cap of an inventive belt retractor with a counter gear in oblique view.
Figure 2:
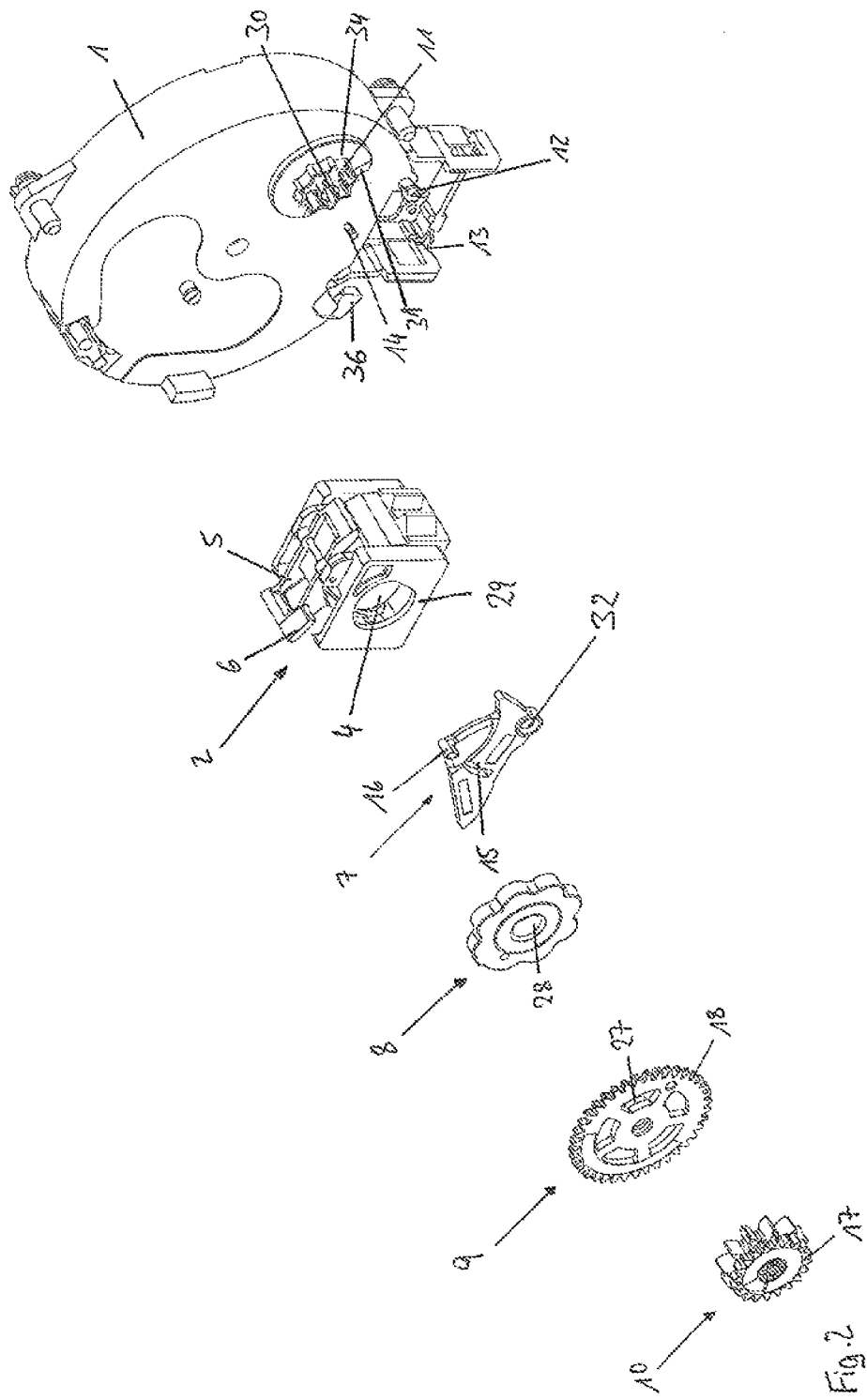
FIG. 2 shows an exploded view of the housing cap with the parts of the counter gear.
Figure 3:
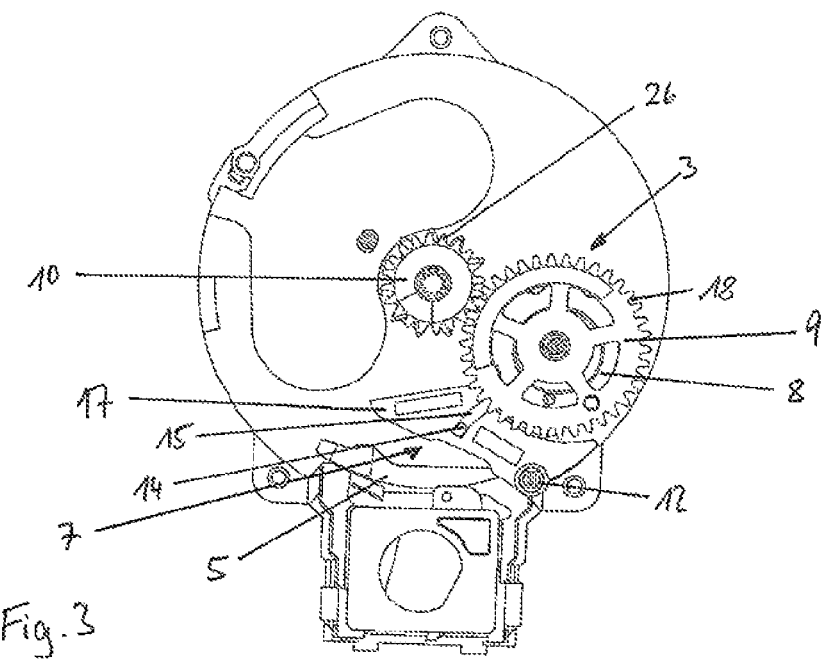
FIG. 3 shows the counter gear with activated sensor device.

In FIG. 1 and FIG. 2, a housing cap 1 of a seat belt retractor for a seat belt device for a vehicle is shown in the assembled state and in an exploded view. Because the belt retractor is not otherwise modified by the invention, the retractor has not been depicted and described further, and only the components that interact with the inventive components are described.

The housing cap 1 is fixed to an outer peripheral side of a leg of a U-shaped belt retractor frame of the belt retractor, wherein a belt shaft is rotatably supported. The housing cap 1 serves, among other things, to cover a blocking device with a locking catch mounted on the belt shaft, the locking catch, in the event of actuation, being driven into a stationary toothing of the belt retractor frame, and the belt shaft thereby being blocked in the direction of extraction of the belt that is rolled up on the belt shaft. In addition, the blocking device has a control disk that is rotatably supported on the belt shaft, the control disk having an external toothing that has a control contour into which the locking catch engages with a pin. When a predetermined value of the vehicle deceleration is exceeded, the locking catch is actuated by a sensor device 2 held on the housing cap 1. The sensor device 2 includes a housing 29 with an inertial mass 4 mounted therein and a first blocking lever that is pivotably supported on the first blocking lever 5. The inertia mass 4 is deflected inside the housing when the predetermined vehicle deceleration has been exceeded, and in this way the inertial mass 4 lifts the first blocking lever 5 which then comes into engagement with the toothing on the control disk and stops the control disk with respect to the belt shaft. Due to this relative movement between the control disk and the belt shaft, the locking catch of the blocking device is then forced into the engagement movement into the stationary toothing of the seat belt retractor frame. In addition, on the housing cap 1, there is also a counter gear 3, a second plate-shaped blocking lever 7, a guiding pin 14, a bearing pin 12, a stationary toothing 11 with a centrally located pin 30, a projecting L-shaped limiting hook 36, and a receiver. The stationary toothing 11 is formed as an annular star and arranged on a step 34 which on the side facing the receiver 13 of the housing cap 1 has a cut-out 31. The stationary toothing 11 is arranged on the housing cap 1, which due to the fixing of the belt retractor to a vehicle can be considered fixed with respect to the vehicle, so that the second toothing 13 can also be considered fixed with respect to the vehicle.

The sensor device 2, along with the housing 29, the inertia mass 4 mounted therein, and the first blocking lever 5 is clipped in a preassembled state into the receiver 13 of the housing cap 1. Here the position and alignment of the receiver 13 depends on the installation position of the belt retractor in the vehicle, so that the inertia mass 4 in the mounted position of the belt extractor is mounted such that it is correspondingly deflected in the event of the predetermined vehicle deceleration and lifts the first blocking lever 5. In a next step, the second blocking lever 7 with an opening 32 is placed on the bearing pin 12 and aligned such that the guiding pin 14 of the housing cap 1 engages in a guide contour 15 of the second blocking lever 7. The guide contour 15 is in the shape of a circular arc-section shaped blocking lever 7, which is aligned such that it is part of an imaginary circle around the center of the opening 32, or as the case may be around the pivot axis of the second blocking lever 7. Here, the second blocking lever 7 is placed with the opening 32 on the bearing pin 12 such that it comes to rest in the cut-out 31 in the step 34 surrounding the stationary toothing 11.

The counter gear 3 includes a first gearwheel 10 connected to the belt shaft such that they rotate together, a second gearwheel 9 that is rotatably supported on the pin 30, and a wobble plate 8. The second rotatably supported gearwheel 9 is shown enlarged in FIG. 8. The second gearwheel 9, in addition to an external toothing, has a central opening 33 and an eccentric 27. The wobble plate 8 also has a central opening 28, with which it is mounted on the eccentric 27 of the second toothed wheel. The first gearwheel 10 turns with the belt shaft and in that way drives the second toothed wheel 9 with the eccentric 27 due to the meshing of the toothings 17 and 18. In FIG. 5 and FIG. 6, the finished preassembled housing cap 1 with the counter gear 3 is seen from the side and in the direction of the cutting plane A-A. The second blocking lever 7 is in a position wherein it engages into the cut-out 31 of the step 34. The internal toothing of the stationary toothed ring 11 continues in a recess in the step 34 and can be recognized as a star form of the pin 30.

In FIG. 7, the same housing cap 1 is seen in cross-section through the wobble plate 8. The wobble plate 8 has a first toothing 19 and a control contour 20 adjacent to the central opening 28. The first toothing 19 is formed by an externally-toothed ring arranged concentrically to the opening 28, the ring engaging into the ring-shaped second toothing 11 on the housing cap 1 up to the recess in the step 34, as can also be seen in FIG. 6. The control contour 20 is formed by a ring, open at one point, which projects toward the same side of the wobble plate, the ring having a wave-shape on the radial outer surface 21 and on the radial inner surface 22 respectively, so that regularly arranged thick points 23 and thin points 24 are formed. At the point at which the control contour 20 is open, the point is provided on one side with a first switching pin 25 projecting radially inward and a second switching pin 35 projecting radially outward. The wobble plate 8, together with the second gearwheel 9, is mounted on the second toothed wheel 9 such that a control pin 16 arranged on the second blocking lever 7 engages from the back into the annular space between the control contour 20 and the stationary second toothing 11 of the housing cap 1. In so doing, the control pin 16 abuts on the radial outer side of the stationary second toothing 11. In this position, the second blocking lever 7 is in a position in which it does not block the first blocking lever 5, as can also be seen in FIG. 5 and FIG. 7.

Figure 4:
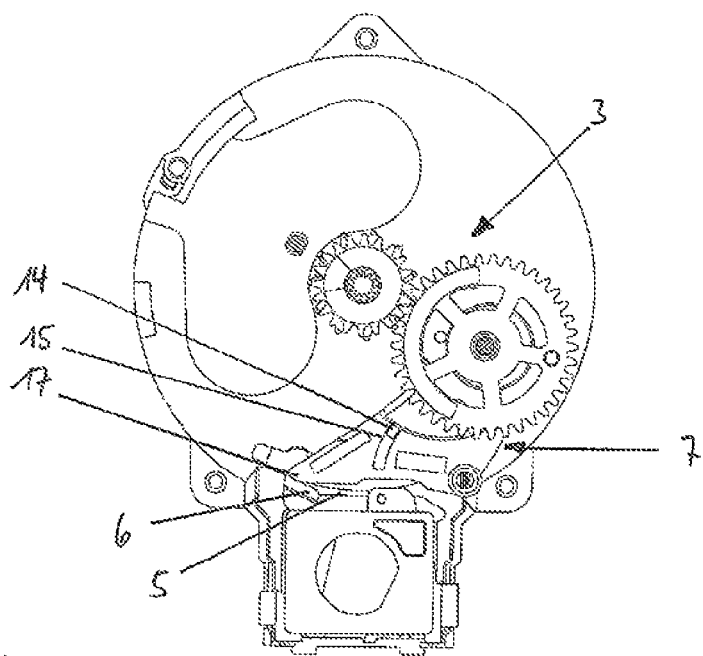
FIG. 4 shows the counter gear with deactivated sensor device.

The wobble plate 8 is rotatably supported on the eccentric 27 discernible in FIG. 8. In addition, the wobble plate 8 engages radially inward with the first toothing 19 into the toothing 11 fixed with respect to the vehicle, the tooth spacing of the first toothing 19 being smaller than the tooth spacing of the second toothing 11, or as the case may be the first toothing 19 having fewer teeth than the second toothing 11. If the belt shaft in the position of the components in FIG. 5 or FIG. 7 is turned in the direction of the extraction of the belt, the first gearwheel 10 drives the second toothed wheel 9 counterclockwise. Here the second gearwheel 9 drives the wobble plate 8 via the eccentric 27, also clockwise. However, because the wobble plate 8 meshes via the first toothing 19 with the stationary toothing 11 and is also rotatably supported on the eccentric 27, it does not complete the rotational movement but is instead driven to make a wobbling movement in the same direction as the rotational movement of the second gearwheel 9 during which it, due to the different number of teeth in the toothings 11 and 19, is turned, with each rotation, at the angle of a tooth spacing of the first toothing 19. Due to the wave-shape of the radial inner surface 22, the wobble plate 8 can perform the wobbling movement around the stationary control pin 16. If, on the other hand, the belt shaft in the position shown in FIG. 5 and FIG. 7 is turned in the direction of belt retraction, the wobble plate 8, based on the same principle, will be driven to make a clockwise wobbling movement. In that way, the control contour 20 with the first switching pin 25 comes into abutment against control pin 16. During the further rotary motion, the control pin 16 of the second blocking lever 7 is then deflected radially outward by the switching pin, so that it comes into abutment against the radial outer surface 21 of the control contour 20. Due to this radial movement of the control pin 16, the second blocking lever 7 is pivoted into the position shown in FIG. 4, via which the second blocking lever 7 with tooth 17 comes into abutment against a contact surface 6 of the first blocking lever 5. When this takes place, the movement of the second blocking lever 7 is additionally guided by the guiding pin 14 of the housing cap, the guiding pin engaging into the control contour 15, so that the second blocking lever 7 is moved in a guided manner toward the contact surface 6 of the first blocking lever 5.

Due to the forced movement of the second blocking lever 7, the lever comes into abutment against the first blocking lever 5, so that the first blocking lever 5 is fixed, and the sensor device 2 is deactivated, because the first blocking lever 5 can no longer perform the movement required to engage into the toothing of the control disk of the blocking device. In addition, the first blocking lever 5 abuts on the inertial mass 4 of the sensor device 2, so that the inertia mass can no longer perform any movements that cause noise. Furthermore, in this position, the first blocking lever 5 and/or the second blocking lever 7 engage the L-shaped limiting hook 36 from behind, so that it is additionally laterally secured.

The activation of the sensor device 2 then takes place due to the belt shaft rotating in the direction of extraction, by which means the wobble plate 8 due to the principle described above once again rotates clockwise. In this way the control contour 20 comes into abutment with the radially external second switching pin 35 against the control pin 16 of the second blocking lever 7 and deflects the control pin 16 radially inward during the subsequent wobbling movement of the wobble plate 8. Due to this radially inwardly directed movement of the control pin 16, the second blocking lever 7 is pivoted clockwise, so that the first blocking lever 5 is once again released and can subsequently perform the movement required to actuate the blocking device. In this way, the vehicle-sensitive sensor device 2 is once again activated.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor for a seat belt device for a vehicle of a type having a blocking device for locking a belt shaft, comprising:
   the belt shaft is rotatably supported in a retractor frame that can be attached to be fixed with respect to the vehicle, a sensor device with a first blocking lever that actuates the blocking device upon a movement of the first blocking lever when a predetermined vehicle deceleration has been exceeded, a second blocking lever that is pivotably supported on the belt retractor for fixing the first blocking lever at a predetermined belt retraction length, a counter gear for controlling the movement of the second blocking lever;

the counter gear is formed by an eccentric driven by the belt shaft and a wobble plate that is driven into a wobbling movement by the eccentric, the wobble plate is formed with a first toothing, a second toothing fixed with to the retractor frame is provided with which the wobble plate meshes during the wobbling movement via the first toothing, and a control contour on the wobble plate, the control contour in the form of a ring with a wave shaped radial inner surface and a wave shaped radial outer surface having a course such that the wobble plate from the predetermined belt retraction length comes into abutment against the second blocking level and deflects the second blocking lever during the subsequent wobbling movement into a position wherein the second blocking lever blocks the first blocking lever from actuating the blocking device.

2. The belt retractor according to claim 1 further comprising, the wobble plate is rotatably supported on the eccentric.

3. The belt retractor according to claim 1 further comprising, the second blocking lever abuts in the position that does not block the first blocking lever on the second toothing fixed with respect to the vehicle.

4. The belt retractor according to claim 3 further comprising, the control contour is formed such that the wobble plate, starting from the predetermined belt retraction length, displaces the second blocking lever from the second toothing fixed with respect to the vehicle.

5. The belt retractor according to claim 3 further comprising, the second toothing fixed with respect to the vehicle is formed by a toothed ring having an internal toothing and an external toothing, the wobble plate abuts with the first toothing on the internal toothing of the toothed ring, and the second blocking lever abuts in the position that does not block the first blocking lever on the external toothing of the toothed ring.

6. The belt retractor according to claim 1 further comprising, the wave shaped radial inner surface and the wave shaped radial outer surface are arranged and dimensioned such that wave crests and wave troughs form regularly arranged thick and thin points.

7. The belt retractor according to claim 1 further comprising the second blocking lever is additionally guided by a guide with respect to the belt extractor.

8. The belt retractor according to claim 7 further comprising, the guide is formed by a guide contour provided on the second blocking lever, with which guide contour the second blocking lever abuts on a vehicle-fixed guide pin.

9. The belt retractor according to claim 8 further comprising, the second blocking lever is formed by a plate and the guide contour is formed by a groove in the plate.

10. A belt retractor for a seat belt device for a vehicle of a type having a blocking device for locking a belt shaft, comprising:

a belt shaft that is rotatably supported in a retractor frame that can be attached to be fixed with respect to the vehicle, a sensor device with a first blocking lever that actuates the blocking device upon a movement of the first blocking lever when a predetermined vehicle deceleration has been exceeded, a second blocking lever that is pivotably supported on the belt retractor for fixing the first blocking lever at a predetermined belt retraction length, a counter gear for controlling the movement of the second blocking lever;

the counter gear is formed by an eccentric driven by the belt shaft and a wobble plate that is driven into a wobbling movement by the eccentric, the wobble plate is formed with first toothing, a second toothing fixed to the retractor frame is provided, with which the wobble plate meshes during the wobbling movement via the first toothing, and a control contour on the wobble plate, the control contour having a course such that the wobble plate from the predetermined belt retraction length comes into abutment against the second blocking level and deflects the second blocking lever during the subsequent wobbling movement into a position wherein the second blocking lever blocks the first blocking lever from actuating the blocking device, the second blocking lever is additionally guided by a guide with respect to the belt extractor, the guide is formed by a guide contour provided on the second blocking lever, with which guide contour the second blocking lever abuts on a vehicle-fixed guide pin.

11. The belt retractor according to claim 10 further comprising, the wobble plate is rotatably supported on the eccentric.

12. The belt retractor according to claim 10 further comprising, the second blocking lever abuts in the position that does not block the first blocking lever on the second toothing fixed with respect to the vehicle.

13. The belt retractor according to claim 12 further comprising, the control contour is formed such that the wobble plate, starting from the predetermined belt retraction length, displaces the second blocking lever from the second toothing fixed with respect to the vehicle.

14. The belt retractor according to claim 12 further comprising, the second toothing fixed with respect to the vehicle is formed by a toothed ring having an internal toothing and an external toothing, the wobble plate abuts with the first toothing on the internal toothing of the toothed ring, and the second blocking lever abuts in the position that does not block the first blocking lever on the external toothing of the toothed ring.

15. The belt extractor according to claim 10 further comprising the wobble plate has a control contour in the form of a ring with a wave shaped radial inner surface and a wave shaped radial outer surface.

16. The belt retractor according to claim 10 further comprising the wave shaped radial inner surface and the wave shaped radial outer surface are arranged and dimensioned such that wave crests and wave troughs form regularly arranged thick and thin points.

17. The belt retractor according to claim 16 further comprising the second blocking lever is formed by a plate and the guide contour is formed by a groove in the plate.

* * * * *